US008827291B2

(12) United States Patent
Cronquist et al.

(10) Patent No.: US 8,827,291 B2
(45) Date of Patent: Sep. 9, 2014

(54) ROLL ENHANCING SNOWMOBILE SKI SUSPENSION FOR DEEPER SNOW RIDING

(76) Inventors: Harold J. Cronquist, Chugiak, AK (US); Troy L. Leiphart, Cornell, WI (US); Gerard John Karpik, Eveleth, MN (US)

( * ) Notice: Subject to any disclaimer, the term of this patent is extended or adjusted under 35 U.S.C. 154(b) by 0 days.

(21) Appl. No.: 13/317,815

(22) Filed: Oct. 29, 2011

(65) Prior Publication Data
US 2012/0112424 A1 May 10, 2012

Related U.S. Application Data

(60) Provisional application No. 61/455,989, filed on Oct. 30, 2010.

(51) Int. Cl.
*B60G 9/04* (2006.01)

(52) U.S. Cl.
USPC ........ 280/124.157; 280/124.158; 280/124.16; 180/190; 180/193

(58) Field of Classification Search
USPC ............... 280/124.135, 124.145, 124.154, 280/124.157, 124.158, 124.16, 5.51; 180/190, 193
See application file for complete search history.

(56) References Cited

U.S. PATENT DOCUMENTS

| | | | | |
|---|---|---|---|---|
| 4,593,921 A * | 6/1986 | Marier | ......................... | 280/21.1 |
| 4,804,198 A * | 2/1989 | Imai et al. | .................... | 280/21.1 |
| 5,533,586 A * | 7/1996 | Thompson | .................... | 180/193 |
| 5,664,649 A * | 9/1997 | Thompson et al. | ........... | 188/314 |
| 5,904,217 A * | 5/1999 | Yamamoto et al. | ........... | 180/193 |
| 6,401,852 B2 * | 6/2002 | Lillbacka et al. | ............. | 180/193 |
| 7,014,004 B2 * | 3/2006 | Etou | ............................ | 180/190 |
| 7,322,435 B2 * | 1/2008 | Lillbacka et al. | ............. | 180/193 |
| 7,377,348 B2 * | 5/2008 | Girouard et al. | ............. | 180/190 |
| 7,594,557 B2 * | 9/2009 | Polakowski et al. | .......... | 180/190 |
| 7,641,181 B2 * | 1/2010 | Delorenzis | ................. | 267/64.13 |

* cited by examiner

*Primary Examiner* — Toan To
(74) *Attorney, Agent, or Firm* — Gerard J. Karpik

(57) ABSTRACT

Disclosed is an improved snowmobile ski suspension including a pair of airspring biasing mechanisms whose air volumes are interconnected by a cross linking conduit that incorporates an open and closed switch. In an alternative embodiment a simpler configuration is provided for which does not include the use of an open or closed switch manifold.

14 Claims, 5 Drawing Sheets

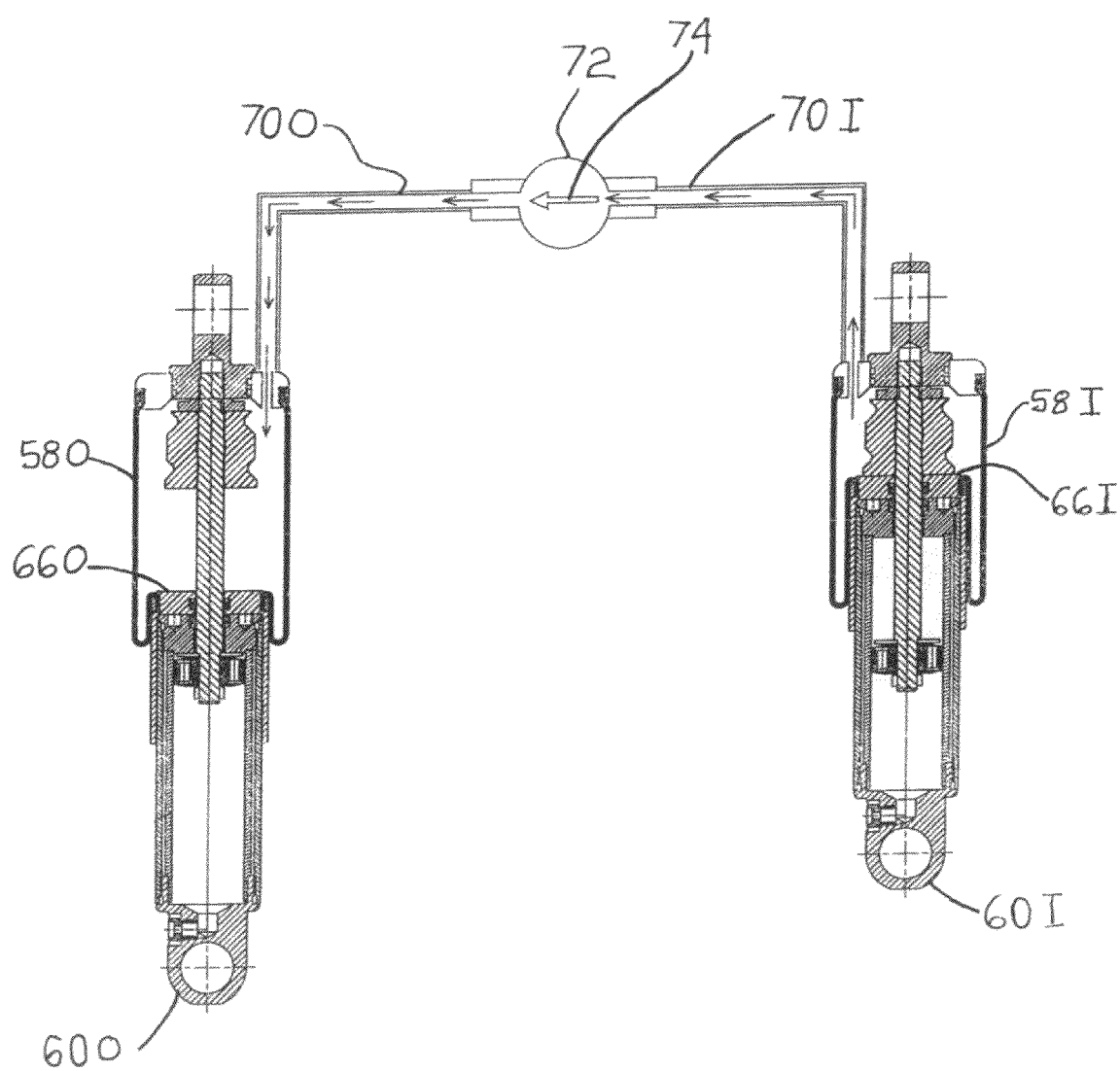

ROLL ENHANCING SNOWMOBILE SKI SUSPENSION FOR DEEPER SNOW RIDING

CROSS REFERENCE TO RELATED APPLICATIONS

This application claims the benefit of provisional patent application Ser. No. 61/455,989, filed Oct. 30, 2010.

REFERENCES CITED

U.S. Patent Documents

U.S. Pat. No. 4,593,921 June 1986 Marier . . . 280/21.1

FIELD OF THE INVENTION

The present invention relates to a new, effective and simple method and apparatus for a roll enhancing snowmobile ski suspension. In particular to a method of interconnecting ski suspension air springs in an arrangement that enhances chassis roll in a snowmobile, making it more maneuverable in deeper snow riding.

BACKGROUND OF THE INVENTION

The fact that most snowmobiles are used over a multitude of surfaces makes it challenging to design them to be efficient in directional control on all surfaces. A significant advantage for a snowmobile would be if it enabled its driver to efficiently change direction on the varied surfaces it may encounter. The amount of effort and driving technique need can vary greatly between one surface to another as well as from one rider or snowmobile to another. Most snowmobiles turn well on groomed trails or hard packed snow surface with wider radius turns with minimal rider input. Often on trails and harder surfaces with tighter corners it is beneficial for riders to shift their weight to the inward side of the corner. Example, on a tight left hand corners the driver may find it beneficial to shift an appropriate portion of his body weight to left hand side of the snowmobiles. A properly proportioned weight shift helps to keep both skis and track in contact with the snow surface helping to guide the sled in a more controlled manner in the direction the rider has chosen. Driving snowmobiles in deeper snow can often require a more aggressive variation of the weight shifting technique than used for hard packed and groomed trails. The technique requires substantial amounts of physical movement and physical efforts from the rider to be effective while maneuvering over, through, up, down and around hills, trees and other obstacles in deeper snow.

Deeper snow riding techniques require a larger degree of weight shift and upper body strength combined with appropriate track thrust to initiate and maintain a lateral rolling motion of the snowmobile toward the inward side of a turn or the uphill or inward side of a slope. In executing a deeper snow riding technique turn the rider works to roll the chassis inward. In doing so the extension force of the outside ski spring will push the ski away from the chassis and often the ski will be in the air. At the same time the rider tries to overcome the inward ski's extension spring forces by a rider weight shift and pulling efforts toward the inward side, as a result the inward ski and its steering surfaces generally are in contact with the snow surface and the snowmobile rolls to the inward side when in deeper snow.

The basic deeper snow riding technique is illustrated in FIG. 1. The snowmobile chassis 10 has an inward side 12 and an outward side 14. The rider 16 has positioned a sizable amount of weight onto the inward side 12 which is nearest the uphill or inward side of the slope 18. The rider 16 is also pulling on the handlebar 20 toward the uphill or inward side. The effect of the rider's deeper snow technique on the snowmobile chassis 10 can be seen in that the outward ski 22 and outward control arm 26 are more extended away from the snowmobile chassis 10 than the inward ski 24 and inward control arm 28 which are compressed more toward the snowmobile chassis 10. The uphill or inward bottom edge of the track 30, acts to cut into the surface of slope 18, forming a ledge like surface that helps the snowmobile chassis 10 to hold its line while traversing slope 18.

The chassis' inward rolled position is largely the result of significant rider effort in executing the inward rider weight shift and the rider's pulling force which acts to overcome the inward ski spring's extension force. As a result of the chassis roll the track's bottom inside edge acts as a cutting edge that helps to cut a ledge like surface into the deeper snow and the snowmobile is able to hold a more controlled line while traversing across the slope of a hill or in a tighter turn than would otherwise be possible if the rider did not use this technique.

It is the inventors understanding that in deeper snow riding a ski suspension designed to reduce the amount of weight shift and pulling effort needed from the rider would help to affect more control in turns or slope traverses and would be advantageous.

SUMMARY OF THE INVENTION AND ADVANTAGES

One way to decrease the rider's efforts to employ a deeper snow riding technique is to reduce the roll resistance of the ski suspension system. Different design and tuning methods have been used in the past which include narrowing the ski track width and using softer than normal ski springs. The goal of this invention is to improve the snowmobile deeper snow handling characteristics while minimizing the negative effect that traditional deeper snow specific design and tuning have had on snowmobiles when they are used on hard pack and trail conditions. Each of the tuning methods mentioned above have their own limitations in meeting our broader handling criteria.

For example, when a snowmobile is designed with a narrower ski track width it will be helpful for deeper snow techniques but will often cause it to roll up on the outside ski while cornering at medium to higher speeds on groomed trails or on hard pack conditions. Systems that use softer than normal ski springs often lack sufficient extension spring pressure to limit chassis roll up onto the outside ski while cornering at medium to higher speeds on groomed trails or on hard pack conditions. Additionally they lack sufficient spring stiffness to stop the ski suspension from bottoming when larger bumps or higher energy impacts are encountered.

It is therefore, a principle object of this invention to provide an improved method that is simple and cost effective, particularly on snowmobiles already equipped with ski airsprings incorporated in their suspension. When compared to conventional snowmobile ski suspensions the new invention decreases rider effort while the rider uses deeper snow riding techniques and has the ability to maintains good handling characteristics when cornering on harder packed snow and groomed trail conditions. Specifically, there is at least one embodiment of the invention that has the ability to be easily switched between settings that have the performance focus on cornering at slow, medium and higher speeds on groomed trails and hard-pack snow, and settings that have the performance focused on deeper snow riding techniques.

It is known that airsprings can be substituted for traditional metal springs in a snowmobile ski suspension. Two popular airshock brands that employ airsprings are the FOX Float produced by FOX Racing Shoxs and the Assault Airshock produced by TeamFAST.com, Inc. Both shocks are used on modern day snowmobile ski suspensions, particularly on sleds that are used in deeper snow riding conditions. Their benefits include reduced weight which is very beneficial to deep snow riders and both are take-apart shock designs using the Decarbon damping systems which makes them tune-able for the end user for specific use and conditions.

In order to facilitate the invention a snowmobile must be equipped with a either a set of ski airsprings through the use of airshocks like those described above or other arrangements that have airsprings as a significant portion of the mechanisms used to bias the skis away from the snowmobile. The airsprings are fitted with the appropriate connectors that allow for conduits to be attached between them that interconnect the air chambers of both airspings. The invention is a cost-effective, easily-installed arrangement that is effective in assisting the roll of the snowmobile toward the inward side of the corner or slope by linking the air volume of the inward ski airspring with the air volume of the outward ski airspring.

On a normal snowmobile with a conventional airspring ski suspension when a rider perform a weight shift to the inward side of the sled the increased mass over the inward airspring compresses it until ifs internal air pressure builds up to the point that its spring force accommodates the effect of the shifted mass and rider pull force. In the new invention pressure build up in the inward ski airspring is reduced by means of the interconnection through the conduit to the outward ski airspring. In this situation the outward ski airspring tends to extend due to the significantly reduced mass above it resulting from the rider weight shift to the inward side and additionally the transfer of air mass and or pressure from the inward ski airspring, helping to initiate and maintain the desired chassis roll toward the inward side. The roll helps the sled cut into the slope or the inward side of the corner delivering a base surface similar to a ledge that the sled operates from rather than sliding down the slope during a traverse. In deeper snow cornering, the cutting action acts to form an inwardly inclined surface that the track rides on enabling the rider to make tighter rolled or banked turns, resulting in a tighter corner while at various speeds in deeper snow.

Riders using deeper snow riding techniques with the new invention experience a significant reduction in the amount of weight shifting required and the amount of pulling force of the handlebars the riders must exert as a result of the reduced spring extending force acting on the inward airspring and the increased spring extending force acting on the outward airspring. The reduction in rider effort translates to a less tiring experience for the rider and often leaves the rider with some reserve capacity of both weight shift and pulling force leaving the rider in a position to potentially have more control over the vehicle when compared to the same sled being used without the new invention. An additional advantage using the new invention is the fact that the system allows for extension spring force settings to be used that are much closer to what would be considered normal levels for trail use. This gives riders the advantage of reducing bottoming when encountering larger bumps or higher energy impacts when bumps contact both skis.

BRIEF DESCRIPTION OF THE SEVERAL VIEWS OF DRAWINGS

The invention pertains to a snowmobile using at least two skis and at least one track.

FIG. 5 is a cutaway view of two or airsprings and shock absorbers connected via conduits with an air valve.

DETAILED DESCRIPTION OF THE INVENTION

It will be obvious to someone experienced in the field of snowmobile design that a multitude of forces are acting on the snowmobile to initiate and maintain the desired inward roll when a deeper snow riding technique is used, not the least of which is the rider's weight shift to the inward side of the centerline of the snowmobile. The new invention acts to creates additional force that would otherwise not occur when using a deeper snow riding technique without the new invention.

Figure 1:
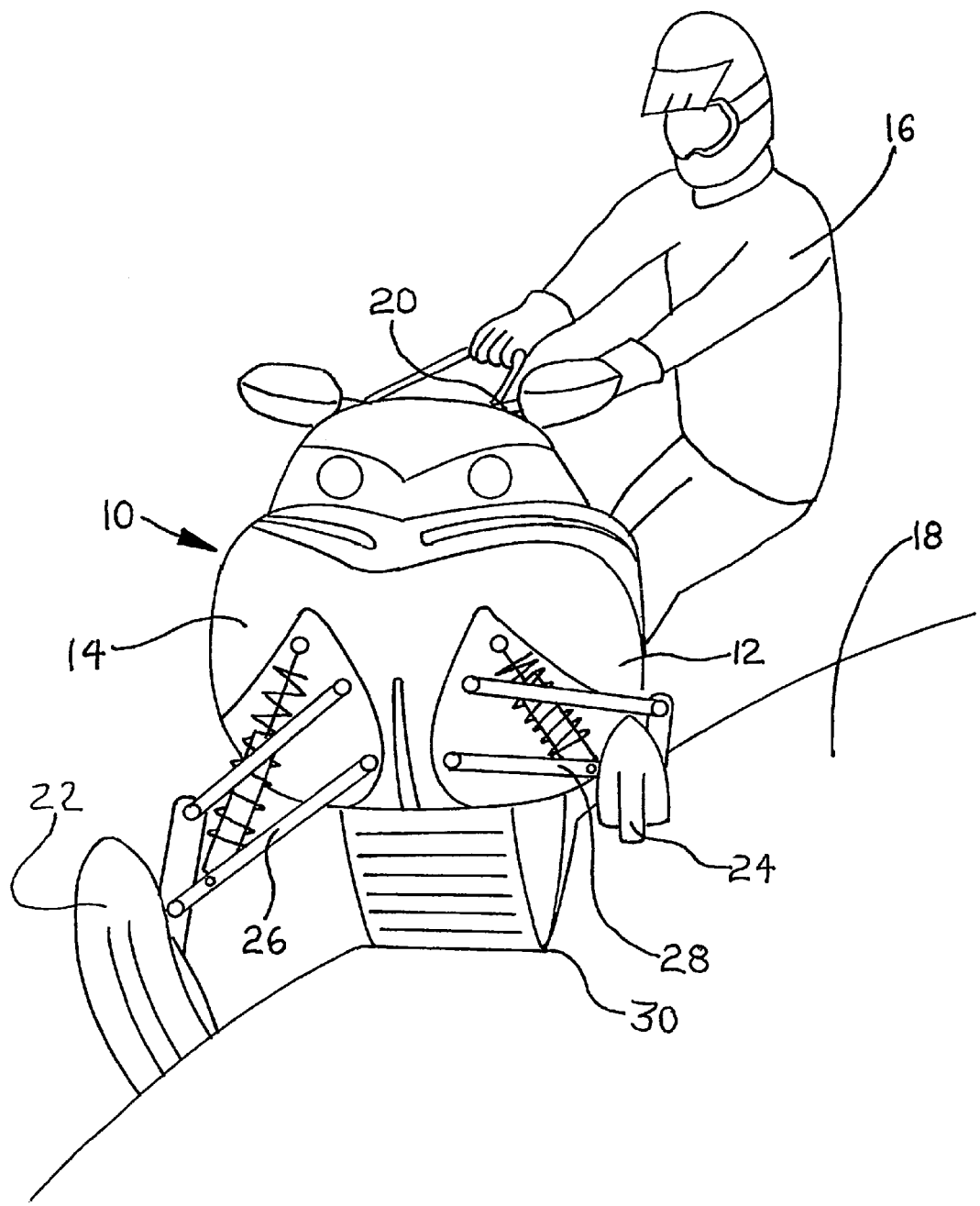
FIG. 1 is a perspective view of a rider employing a deeper snow riding technique on a snowmobile employing a traditional ski suspension which uses helical coil compression springs.
Figure 2:
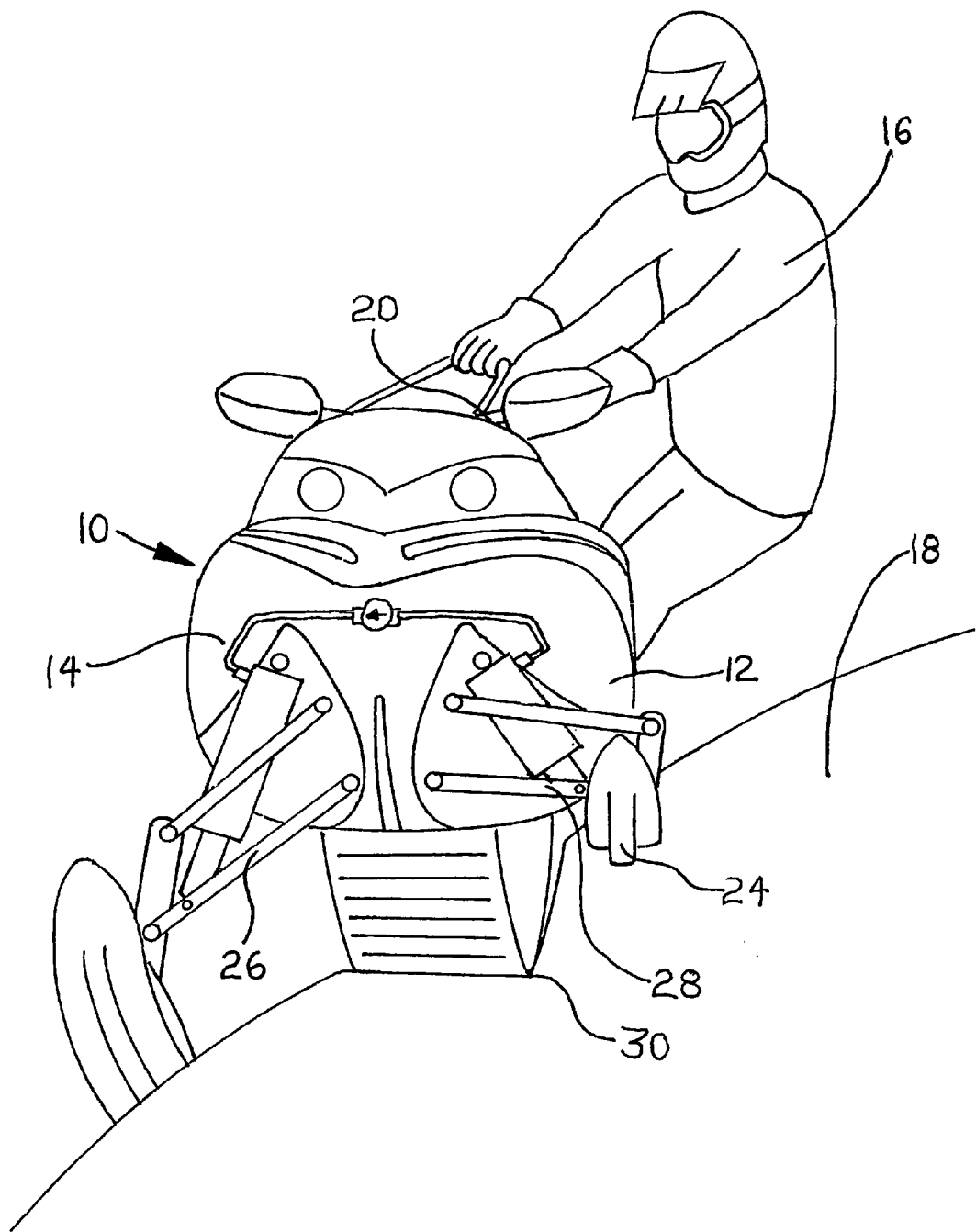
FIG. 2 is a perspective view of a rider employing a deeper snow riding technique while riding on a snowmobile equipped with the new invention.
Figure 4:
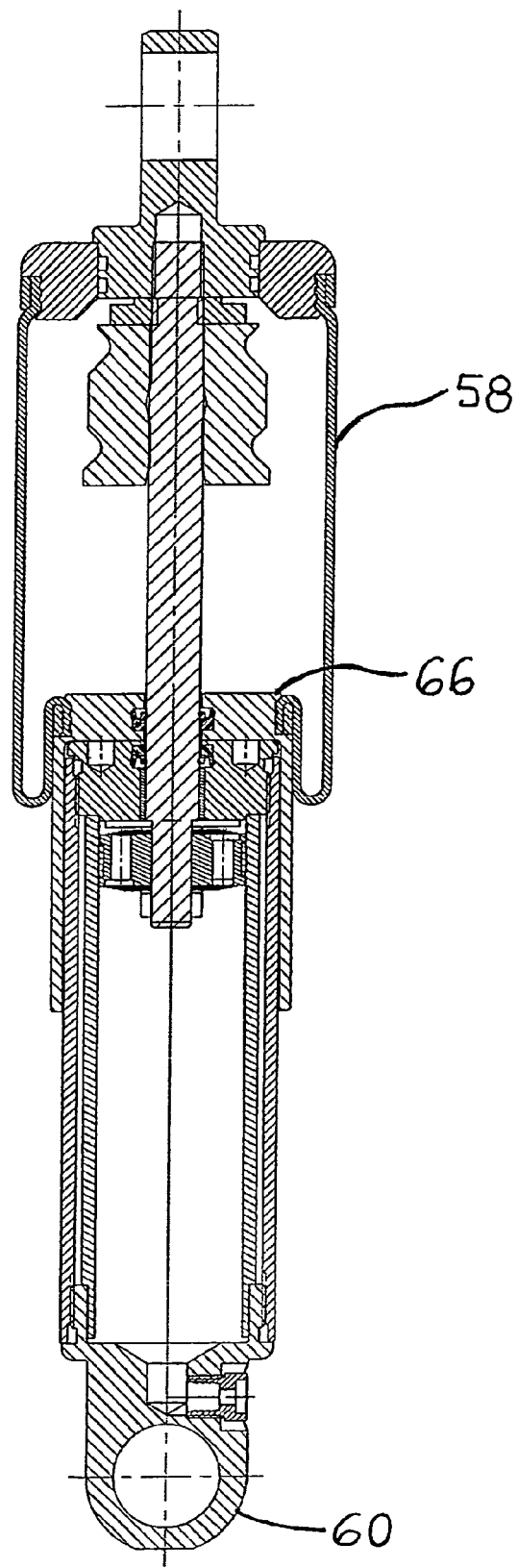
FIG. 4 is a cutaway drawing of one version of an airspring and shock absorber assembly.

An effective snowmobile ski suspension should have sufficient extension spring force to stop the snowmobile suspension from bottoming frequently in medium and larger bumps. Frequent bottoming causes jarring to the rider and can be detrimental to the snowmobile structure. Commonly two springing mediums are used in today's snowmobile ski suspensions, either traditional helical metal compression coil springs as can be seen on the snowmobile in FIG. 1 or the recently popularized airsprings as can be seen in FIG. 2. Many modern snowmobiles use airsprings as at least a part of their springing mechanism and when the shock absorber and airsprings are combined in one unit they are commonly known as airshocks. As used in the snowmobile industry today these two differing systems are fairly interchangeable as often they use the same mounting points on the snowmobile. There are several versions of airshocks being sold in the snowmobile market today but generally they either have a flexible rolling lobe air chamber 58 design as illustrated in FIG. 4 or they incorporate a metal air chamber. In either design, as the shock absorber is compressed a portion of the shock assembly inserts itself into the air spring chamber which reduces its volume resulting in a progressively higher air pressure within the air chamber. As the terrain, forces and loads experienced by the snowmobile and rider are quite similar regardless of the springing medium, fairly similar handling traits are obtained from each springing medium by deeper snow riders on conventional snowmobile ski suspensions.

A rider utilizing a deeper snow riding technique on a conventional snowmobile ski suspension with either type of springing arrangements will need to exert a much greater degree of weight shift and pulling effort to achieve the same degree of chassis roll as a rider on a sled using the new invention. This is because unlike with the new invention the resistive forces built up by either the helical coil spring or the airspring have no means of being reduced as the snowmobile rolls. This creates the need for more leverage force to roll the snowmobile over to the same degree of roll as a rider on a snowmobile utilizing the new invention. The rider on a snowmobile without the invention will experience higher degrees of physical fatigue because of the extra weight shift and pulling force required in maneuvering the snowmobile. In FIG. 1, a rider is shown hanging well off the inward side of a snowmobile without the new invention. In FIG. 2, the same rider is shown on a snowmobile with the new invention. Even if the rider in FIG. 1 may be able to achieve similar roll result through greater efforts, the more extreme weight shift needed on the standard snowmobile requires the riders to position their body further from the snowmobile which can leave riders more fatigued and in a less safe position as their bodies are exposed to more obstacles.

Figure 3:
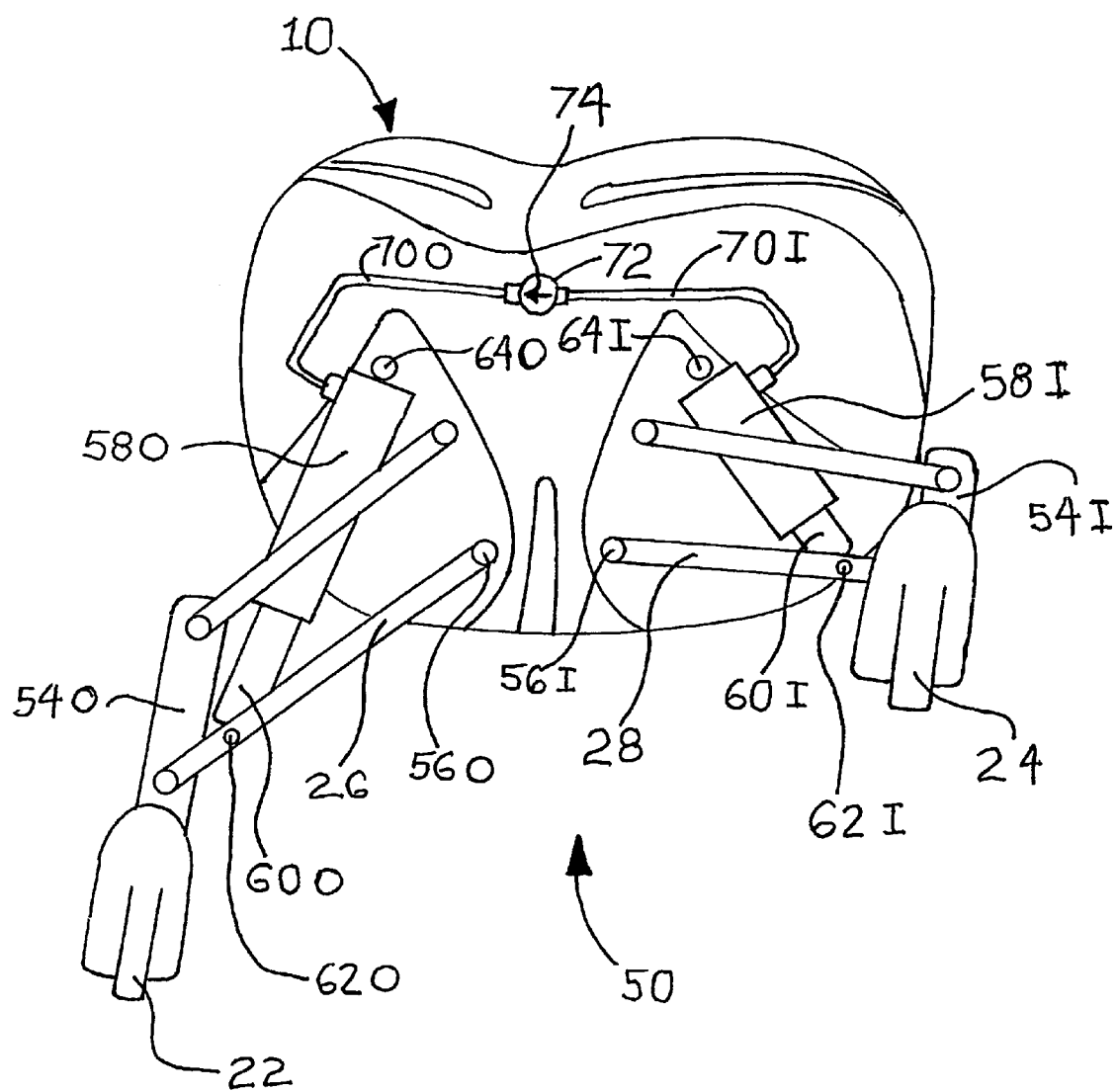
FIG. 3 is a view of one version of the ski suspension with the new invention in the approximate position of a slope traverse.

Turning now in greater detail to the new invention as seen in FIG. 3, the ski suspension system 50 mounted to snowmobile chassis 10 generally includes inward and outward lower control arms 26 and 28. The control arms are connected to their respective spindle housing 54I and 54O. They are operatively connected to steering skis 22 and 24 by means of spindles which are not shown. The lower control arms 26 and 28 are connected to the snowmobile chassis 10 at their respective pivot points 56I and 56O. In this embodiment the airsprings 58I and 58O are connected to their respective shock absorbers 60I and 60O. In this embodiment, the shock absorbers 60I and 60O are connected to their respective control arms 28 and 26, at their respective pivot points 62I and 62O, another common means of attachment of the shock absorbers 60I and 60O is to pivot points on their respective spindle housings. The upper end of shock absorber 60I and 60O are connected to the snowmobile chassis 10 at their respective pivot points 64I aid 64O. The airspring 58I is interconnected by means of a conduit 70I to one end of an air valve 72. Conduit 70O is interconnected to airvalve 72 at another end and then interconnects to airspring 58O. The airvalve 72 has internal ports that allow air mass and pressure to transfer back and forth between airsprings 58I and 58O when the valve is in the open position, which is indicated in this example by the valve switch arrow 74 being pointed in a horizontal position. When the air valve 72 is closed, which in this example would be when the valve switch arrow 74 would be oriented in the vertical position, no air would pass between the airsprings.

In FIG. 2 it can be seen that the rider has shifted both legs and upper body to the uphill or inward side of the chassis 12 and that his body remains reasonably close to the snowmobile chassis 10. It can also be seen in this traverse it is still necessary for the rider to pull on the handlebars 20 to remain on the snowmobile, thus concentrating his mass and pulling force over the inward airspring 58I. The pulling force and extra mass over inward airspring 58I causes the shock absorber 60I and inward airspring 58I to compress. As the shock absorber compresses it inserts a portion of its body assembly 66I into the inward airspring 58I. As a result of the insertion the volume of the airspring 58I is reduced in size. The volume reduction results in an increase in air pressure within the airspring 58I. With the air valve 72 in the open position the increased air pressure is shared through the conduits 70I and 70O with the outboard airspring 58O as illustrated in FIG. 5 by the arrows traveling from 58I to 58O. As a result of the pressure increases in 58O, the extension forces are also increased which help to push or extends the shock absorber body 66O outwardly. These extension force tend to cause the shock absorber body 66O to extend away from the upper mount 64O, which in turn pushes control arm 26 and spindle 54O away from the snowmobile chassis 10 causing outward ski 22 to extend away from snowmobile chassis 10, which helps to initiate and maintain the snowmobile roll toward the inward slope or inward side of the corner until the outward ski 22 breaks away from the snow surface. As a result of the new invention's ability to reduce the air pressure and extending forces of airspring 58I coupled with the resultant increase in extension forces of airspring 58O the desired body roll is accomplished with a lesser degree of effort from the rider and at the same time delivering a less fatiguing riding experience.

The needs and requirements of many true deeper-snow riders could be met with a simplified version of the invention that does not have an on off valve between the two airspring assemblies 58I and 58O. For many of these riders the valve 72 can be replaced with a less expensive tee fitting between conduit 70I and 70O, using the third leg of the tee fitting to mount a Schrader valve for filling and static pressures adjustment within the system. An even simpler system and more reliable system would be to have a single conduit connect the two airsprings directly and have the Schrader filler mechanism mounted directly to at least one of the airsprings. Those riders that do encounter a larger amount of groomed trail and hard pack conditions will be able to take advantage of the slightly more complex version of the invention that includes airvalve 72. With the airvalve in the closed position no passage of air will occur between airsprings 58I and 58O. The closed position converts the snowmobile ski suspension back to a standard snowmobile ski suspensions with all the benefits that independent airsprings deliver to riders cm trails and hard pack conditions. These advantages include a higher degree of roll resistance in comparison to when the invention is in the open position and better bottoming resistance when bumps are encountered independently at each ski.

Although throughout this document drawings and description of turning and slope traversing has been mostly in one direction the invention works equally well in other directions of turning and slope traversing.

The invention has been described in an illustrative manner, and it is understood that the terminology which has been used is intended to be in the nature of words of description rather than of limitations.

Obviously many modifications and variations of the invention are possible including but not limited to: Different control valves including solenoid controlled air valves and other electronically actuated valve mechanisms including valves that incorporate programmable logic controllers, computers and software. Alternative mountings of the airsprings to different control arms, independent mounting of the airsprings from the shock absorbers, airsprings and other spring forms used together. Other gases other than air could also be used.

What is claimed:

1. A snowmobile suspension assembly including: a snowmobile chassis supported on opposite sides of the longitudinal centerline of the chassis by a set of steerable skis or other surface engaging directional devices; said steerable skis being operatively suspended from opposite sides of the chassis wholly or in part by means of pressurized air springs; said pressurized air springs incorporating internal air chambers capable of providing extension forces; a conduit means that permits connecting the internal air pressure of the air chamber on one side of said longitudinal centerline to the internal air pressure of the air chamber on the opposite side of said longitudinal centerline; said conduit arranged to permit continuous connection between said air chambers even while the steerable skis become steered; the conduit connection between the air chambers providing means for sharing air pressure from either of the air chambers with the air chamber on opposite side of said longitudinal centerline; said air pressure sharing permitting a reduction in resistance to chassis roll when steering.

2. The snowmobile suspension assembly of claim 1 wherein; an air valve is disposed between the air chambers that are on opposing sides of the longitudinal centerline; said air valve being arranged to selectively permit the sharing of air pressure between the opposing air chambers.

3. The snowmobile suspension assembly of claim 2 where; the regulation of air flow is controlled by means of a valve mechanism that is either in part or wholly actuated by electrical current.

4. The snowmobile suspension assembly of claim 1 where; a device permits regulation of air flow.

5. The snowmobile suspension assembly of claim 4 where; regulation of air flow is further controlled by computer, programmable logic controller, or other programmable software operating device.

6. The snowmobile suspension assembly of claim 5 where; the computer and or software can be selectively programmed while suspension is at rest or in use.

7. The snowmobile suspension assembly of claim 1 where; other industrial gases that include but are not limited to nitrogen gas and carbon dioxide gas or where any combination of gases are used in the place of air inside the air chambers.

8. A snowmobile suspension assembly including: a snowmobile chassis supported on opposite sides of the longitudinal centerline of the chassis by a set of steerable skis or other surface engaging directional devices; said steerable skis being operatively connected to said chassis by means of spindles, spindle housings, control arms and shock absorbers; said steerable skis being operatively suspended from opposite sides of the chassis wholly or in part by means of pressurized air springs; said pressurized air springs incorporating internal air chambers capable of providing extension forces; a conduit means that permits connecting the internal air pressure of the air chamber on one side of said longitudinal centerline to the internal air pressure of the air chamber on the opposite side of said longitudinal centerline; said conduit arranged to permit continuous connection between said air chambers even while the steerable skis become steered; the conduit connection between air chambers providing means for sharing air pressure from either of the air chamber with an air chamber on the opposite side of said longitudinal centerline; said air pressure sharing permitting a reduction in resistance to chassis roll when steering.

9. The snowmobile suspension assembly of claim 8 wherein; an air valve is disposed between the air chambers that are on opposing sides of the longitudinal centerline; said air valve being arranged to selectively permit the sharing of air pressure between the opposing air chambers.

10. The snowmobile suspension assembly of claim 9 where; the regulation of air flow is controlled by valve means that is in part or wholly actuated by electrical current.

11. The snowmobile suspension assembly of claim 8 where; a device permits regulation of air flow.

12. The snowmobile suspension assembly of claim 11 where; regulation of pressure flow is further controlled by computer, programmable logic controller, or other programmable software operating device.

13. The snowmobile suspension assembly of claim 12 where; the computer and or software can be selectively programmed while the suspension is at rest or while in use.

14. The snowmobile suspension assembly of claim 8 where; other industrial gases that include but are not limited to nitrogen gas and carbon dioxide gas or where any combination of gases are used in the place of air inside the air chambers.

* * * * *